(12) United States Patent
Wannamaker

(10) Patent No.: US 10,321,189 B1
(45) Date of Patent: *Jun. 11, 2019

(54) METHODS AND SYSTEMS FOR CONTENT MANAGEMENT

(71) Applicant: COMCAST CABLE COMMUNICATIONS, LLC, Philadelphia, PA (US)

(72) Inventor: Jeffrey Ronald Wannamaker, London (CA)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/463,650

(22) Filed: Mar. 20, 2017

Related U.S. Application Data

(63) Continuation of application No. 14/885,663, filed on Oct. 16, 2015, now Pat. No. 9,654,828, which is a continuation of application No. 14/192,126, filed on Feb. 27, 2014, now Pat. No. 9,197,932.

(51) Int. Cl.
| | | |
|---|---|---|
| *H04N 21/45* | (2011.01) | |
| *G11B 27/10* | (2006.01) | |
| *H04N 21/845* | (2011.01) | |
| *H04N 21/4147* | (2011.01) | |
| *H04N 21/6543* | (2011.01) | |

(52) U.S. Cl.
CPC ......... *H04N 21/4532* (2013.01); *G11B 27/10* (2013.01); *H04N 21/4147* (2013.01); *H04N 21/6543* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 9,445,159 | B2 * | 9/2016 | Miller | H04N 5/44543 |
| 2004/0015999 | A1 * | 1/2004 | Carlucci | H04N 5/76 |
| | | | | 725/136 |
| 2007/0130597 | A1 * | 6/2007 | Parker | H04H 20/38 |
| | | | | 725/94 |
| 2008/0306962 | A1 * | 12/2008 | Grannan | H04N 5/782 |
| 2009/0210913 | A1 * | 8/2009 | MacDonald | H04N 5/782 |
| | | | | 725/85 |
| 2010/0199312 | A1 * | 8/2010 | Chang | G06F 17/30053 |
| | | | | 725/46 |

* cited by examiner

*Primary Examiner* — Hoang Vu A Nguyen Ba
(74) *Attorney, Agent, or Firm* — Ballard Spahr LLP

(57) ABSTRACT

Methods and systems for managing content are disclosed. An example method can comprise monitoring a number of users accessing content, and recording a first segment of the content if the number of users accessing the content reaches a threshold value. A second segment of the content can be recorded based on a request to record the second segment of the content, and at least a portion of the recording of the first segment of the content can be associated with the recording of the second segment of the content.

20 Claims, 9 Drawing Sheets

METHODS AND SYSTEMS FOR CONTENT MANAGEMENT

CROSS REFERENCE TO RELATED APPLICATION

This application is a continuation of U.S. application Ser. No. 14/885,663, filed Oct. 16, 2015, which is a continuation of U.S. application Ser. No. 14/192,126, filed Feb. 27, 2014 and issued as U.S. Pat. No. 9,197,932, which are herein incorporated by reference in their entirety.

BACKGROUND

Digital video recorders allow users to record content. Users may look for content by browsing through a list of content transmissions. When a user arrives at a content of interest, the user may choose to record the content. Digital video recorders only allow users to record portions of the content that are transmitted after the user access at a content transmission. There is a need for more sophisticated content recording techniques that allow users to record portions of content that are transmitted or occur before a user accesses the content.

SUMMARY

It is to be understood that both the following general description and the following detailed description are exemplary and explanatory only and are not restrictive, as claimed. Provided are methods and systems for managing content. An example method can comprise monitoring a number of users accessing content (e.g., transmission, stream, file) and recording a first segment of the content if the number of users (e.g., subscribers, clients, devices) accessing the content reaches a threshold value. A second segment of the content can be recorded based on a request to record the second segment of the content, and at least a portion of the recording of the first segment of the content can be associated with the recording of the second segment of the content.

In another aspect, an example method can comprise recording a first segment of content (e.g., transmission, stream, file) and receiving a second segment of the content from a remote device. The remote device can be configured to record or otherwise store the content in a temporary recording buffer based on a threshold number of users (e.g., subscribers, clients, devices) accessing the content. At least a portion of the first segment can be associated with at least a portion of the second segment and provided as a single item of content.

In another aspect, an example method can comprise receiving a request to access content (e.g., transmission, stream, file) from a first user and recording a first segment of the content based on the request. The first segment can begin at a first time. A request to record a second segment of the content can be received from a second user, and the second segment of the content can be recorded. The second segment can begin at a second time. At least a portion of the recording of the first segment of the content can be associated with the recording of the second segment of the content.

In another aspect, content (e.g., transmission, stream, file) can be requested. A first segment of the content can be recorded at a device if a number of users (e.g., subscribers, clients, devices) accessing the content reaches a threshold value. A second segment of the content can be requested to be recorded and access to at least the recording of the second segment of the content can be requested. In response to requesting access to at least the recording of the second segment of the content, access can be granted and/or received to a recording of the content comprising at least some of the recording of the first segment of the content and at least some of the recording of the second segment of the content.

In another aspect, a number of users accessing content (e.g., transmission, stream, file) can be monitored. Content can be recorded, starting at a first time, in a time-shift buffer based on the number of users (e.g., subscribers, clients, devices) accessing the content reaching a threshold value. The content can be recorded (e.g., in a storage location such as local or remote storage), starting at a second time, based on a request from a user. The recording of the content in the time-shift buffer and the recording of the content requested by the user can be combined (e.g., at the storage location or other device) or otherwise associated.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
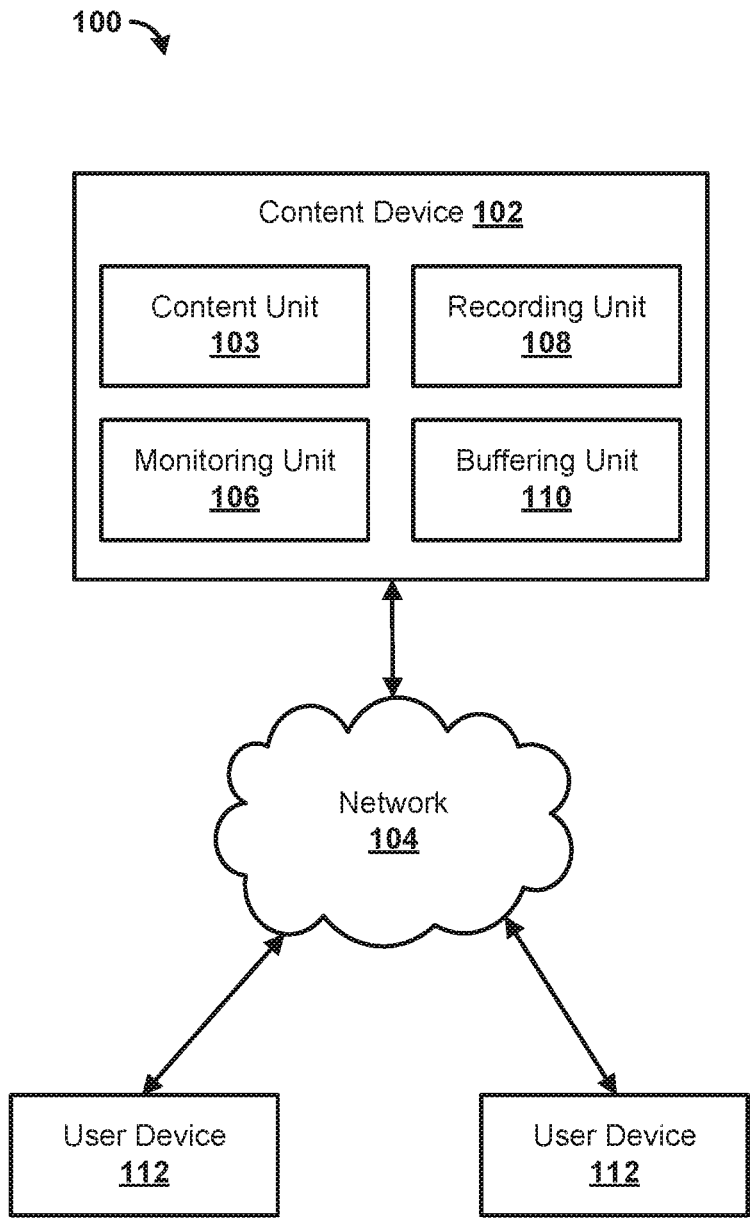
FIG. 1 is a block diagram illustrating a system for providing content.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods and systems for recording content and for providing recorded content. In one aspect, the present methods and systems can maintain recording buffers (e.g., time-shift buffers) while users (e.g., devices) are accessing (e.g., viewing) content. For example, a recording buffer can continue to record content from a service, such as a content transmission (e.g. stream, file transfer), while at least a threshold number of users (e.g., subscribers, clients, devices) are accessing the content. In one aspect, a user can request that a portion of the content transmission be recorded. The request, however, might occur after a specific content item (e.g., show, program, movie) within the content transmission has already begun. The present methods and systems allow a user to receive a recording that comprises portions of the content transmission both before and after the user requests a recording of the content transmission to begin. For example, the portion of the content transmission recorded after the request can be combined or otherwise associated with portions of the content transmission that are recorded in a recording buffer before the request. The combined portions of the content transmission can together comprise a content item. Such combination and/or association of recorded content can be accomplished even though the user requesting the content did not access the content when the first portion of the content transmission was delivered to users. For example, a portion of a content transmission that is recorded in a time-shift buffer for one or more users can be used for the benefit of one or more other users. Content stored in such recording buffers can be shared among the users, as well as copied, added, associated or otherwise assimilated into subsequent recordings requested by other users.

Those skilled in the art will appreciate that present methods may be used in systems that employ both digital and analog equipment. One skilled in the art will appreciate that provided herein is a functional description and that the respective functions can be performed by software, hardware, or a combination of software and hardware.

In an exemplary embodiment, as described in more detail herein the methods and systems disclosed can be located within one or more of a monitoring unit, a recording unit, and/or a buffering unit of the content device described herein. For example, the monitoring unit can count the number of users accessing a content transmission. If the number of users (e.g., subscribers, clients, devices) is above a threshold amount, the buffering unit can record a content transmission in a recording buffer. The recording unit can combine the recorded portion of the content transmission in the recording buffer with other recorded portions of content transmission requested by a user.

FIG. 1 is a block diagram illustrating a system 100 for providing content. In one aspect, the system 100 can comprise a content device 102. The content device 102 can be communicatively coupled to one or more devices through a network 104. In one aspect, the network 104 can comprise a packet switched network (e.g., internet protocol based network), a non-packet switched network (e.g., quadrature amplitude modulation based network), and/or the like. The network 104 can comprise network adapters, switches, routers, modems, and the like connected through wireless links (e.g., radio frequency, satellite) and/or physical links (e.g., fiber optic cable, coaxial cable, Ethernet cable, or a combination thereof). In one aspect, the network 104 can be configured to provide communication from telephone, cellular, modem, and/or other electronic devices to and throughout the system 100.

In one aspect, the content device 102 can comprise a content unit 103. The content unit 103 can be configured to provide content to devices (e.g. user devices 112) through the network 104. For example, the content unit 103 can be configured to provide access to a plurality of content transmissions and services related to content. A content transmission can comprise a content stream, file transfer, and/or the like. For example, the content transmissions can be organized as channels (e.g., live content streams), content on demand, content recordings, and/or other content resources. The content unit 103 can comprise one or more servers configured to provide content channels (e.g., live content streams), video on demand content, recorded content, electronic program guide information related to the content transmissions, and the like. As another example, the content unit 103 can comprise one or more content encoders, modulators, multiplexers, packagers (e.g., for fragmenting content), and the like. The content unit 103 can be implemented as a content server, such as a converged cable access platform (CLAP). In one aspect, the content unit 103 or particular functions thereof can be implemented as one or more other devices connected to the network 104.

In one aspect, the content device 102 can comprise a monitoring unit 106 configured to monitor and/or track users' access to a plurality of content transmissions and/or other related services. For example, the monitoring unit 106 can be configured to receive notifications when a user accesses a content transmission. As an illustration, the monitoring unit 106 can receive notifications that a user is requesting a content transmission. The monitoring unit 106 can also receive notifications when a user discontinues accessing the content transmission. In one aspect, an example notification can comprise one or more identifiers, such as user identifiers, time identifiers, network identifiers, content identifiers, and the like. For example, content identifiers can be configured to identify content and/or a content transmission providing the content. For example, the content identifiers can identify a content channel, content location, program identifier, series identifier, video on demand content, and the like.

In one aspect, the monitoring unit 106 can be configured to compare a content identifier received in a notification to a content identifier received in one or more previous notifications. For example, the monitoring unit 106 can be configured to receive a first notification at a first time and a second notification at a second time. The first notification can comprise a first content identifier associated with a user. The second notification can comprise a second content identifier associated with the user. The monitoring unit 106 can determine that a user has changed from one content transmission to another content transmission (e.g., or other content related service) based on a comparison of the first content identifier and the second content identifier. For example, if the first content identifier and second content identifier do not match, then the monitoring unit 106 can be configured to determine that the user is no longer viewing or otherwise accessing the content transmission associated with the first content identifier. In one aspect, the content identifiers can match if they have a threshold amount of similarity. As a further example, the monitoring unit 106 can be configured to track devices, such as tuners, associated with a user. For example, each device associated with a user can have an identifier unique to the device.

In one aspect, the monitoring unit 106 can be configured to count the number of users accessing a specified content transmission. For example, the monitoring unit 106 can comprise one or more counters. The counters can be associated with a specified content transmission. As an example, a counter can comprise any numerical value, such as 0, 1, 0.5, 10, 200, 500, 10000, and the like. For example, the counter can range from zero to as large a number as can be stored in the content device 102.

As an illustration, when the monitoring unit 106 identifies that a user is accessing a content transmission, the monitoring unit 106 can increment a counter associated with the content transmission. As another example, when the monitoring unit 106 receives a notification that a user has requested content, the monitoring unit 106 can increment a counter associated with a content identifier in the notification. In one aspect, the monitoring unit 106 can be configured to decrement a counter associated with a content transmission when a user discontinues accessing the content transmission. For example, the monitoring unit 106 can decrement a counter based on a comparison of a first notification to a second notification received after the first notification. If the content identifier of the first notification is different than the content identifier of the second notification, then the monitoring unit 106 can decrement a counter associated with the content identifier of the second notification. As another example, the monitoring unit 106 can decrement a counter after receiving a notification that the user has discontinued access of the content transmission.

In one aspect, the content device 102 can comprise a recording unit 108 configured to manage recorded content and the recording thereof. For example, the recording unit 108 can be configured to receive requests to record content. As an illustration, the content device 102 can receive content through one or more services, such as content transmissions (e.g., content stream, file transfer). In one aspect, the recording unit 108 can begin recording a content transmission immediately after receiving a request for recording a content transmission. In another aspect, the recording unit 108 can be configured to maintain a schedule of future recordings requested by users. The recording unit 108 can then record a portion of a content transmission when the content transmission becomes available or is otherwise scheduled for recording. In one aspect, the recording unit 108 can be configured to associate one or more identifiers with a recorded portion of a content transmission. The one or more identifiers can comprise, for example, user identifiers, recording identifiers, content identifiers, service identifiers, and the like. In one aspect, the recording unit 108 can be configured to process requests for recorded portions of content transmissions. For example, the recording unit 108 can be configured to provide a recorded portion of a content transmission to a user at a variety of user devices and locations throughout the network 104.

In one aspect, the content device 102 can comprise a buffering unit 110 configured to provide and/or manage one or more recording buffers. Recording buffers can be temporarily or permanently associated with services, such as content transmissions, and the like. For example, a recording buffer can be configured to at least temporarily record and store content from an associated content transmission. In one aspect, the buffering unit 110 can manage the plurality of recording buffers according to one or more statuses associated with the recording buffers. Example statuses can comprise: assigned, unassigned, active, inactive, and the like. As an illustration, a recording buffer with the assigned status can be assigned to a content transmission. Similarly, a recording buffer associated with the unassigned status is not assigned to a content transmission. A recording buffer associated with the active status can be actively recording content from a content transmission. A recording buffer associated with the inactive status is not currently active in recording a content transmission. In one aspect, the buffering unit 110 can be configured to change the status of one or more recording buffers by assigning, unassigning, activating, and deactivating the recording buffers according to user's requests to access and/or record content from content transmissions.

In one aspect, a recording buffer can be configured as a temporary buffer, such as a time-shift buffer. One or more of the recording buffers can be limited in the amount of a content transmission the recording buffer is allowed to store. For example, a recording buffer can be configured to record X number of minutes of a content transmission at Y bit rate. As an illustration, the buffering unit 110 can provide a recording buffer configured to store 30 minutes of a content transmission at a first bit rate, 60 minutes of a content transmission at a second bit rate, 90 minutes of a content transmission at a third bit rate, 120 minutes of a content transmission at a fourth bit rate, or the like. Example bit rates can comprise, 800 Kbps, 1200 Kbps, 1800 Kbps, 2400 Kbps, and/or the like. In one aspect, a recording buffer can be updated with new content from a content transmission. For example, if a recording buffer reaches its storage limit, then the buffering unit 110 can be configured to delete or overwrite a portion of the recorded content transmission, such as the oldest portion of the content transmission, and record new content from the content transmission instead, thereby maintaining the recording buffer at its limit. For example the buffering unit 110 can be configured to maintain the most recent X number of minutes of a content transmission in the recording buffer.

In one aspect, the buffering unit 110 can provide a recording buffer based on a number of users accessing a content transmission (e.g., content stream, content file transfer). For example, the buffering unit 110 can receive a notification that a user is accessing and/or requesting access to a content transmission. The buffering unit 110 can determine if a recording buffer is assigned to and/or actively recording a content transmission. For example, the buffering unit 110 can receive such notifications and/or other information from the monitoring unit 106. As an illustration, the buffering unit 110 can receive a count of the number of users (e.g., subscribers, clients, devices) accessing the content transmission. The buffering unit 110 can be configured to compare the count to a threshold value. If the count is above (e.g., or equal to) the threshold value, then the buffering unit 110 can assign a recording buffer to the content transmission. The buffering unit 110 can activate the assigned recording buffer such that the recording buffer begins to record the content transmission. If the count is below the threshold value, then the buffering unit 110 can unassign and/or deactivate a recording buffer assigned to the content transmission. The threshold value can be any value, such as 0, 1, 5, 10, 100, 500, 2000, 5000, or the like. For example, if the threshold value is one, then the buffering unit 110 can be configured to assign a recording buffer to a content transmission and activate the recording buffer to record the content transmission any time there is at least one user and/or device accessing the content transmission.

In one aspect, the buffering unit 110 can be configured to end recording the content transmission if the number of users (e.g., subscribers, clients, devices) accessing the content transmission becomes less than the threshold value. In one aspect, the buffering unit 110 can be configured to stop recording in a recording buffer and/or erase the recording buffer when the number of users (e.g., subscribers, clients, devices) accessing the content transmission becomes less than the threshold value. In another aspect, the buffering unit 110 can be configured to continue recording the content transmission if the number of users accessing the content transmission becomes less than the threshold value. For example, the recording can be continued based on a prediction that the number of users accessing the content transmission will reach the threshold value again within a specified time period. The prediction can be based on user viewing statistics. The user viewing statistics can comprise user viewing history for the content transmission at a variety of times. The specified time period can be any number of seconds and/or minutes, such as 10, 20, 30, or 45 seconds or 1, 3, 5, 10, 30, 45 minutes and the like.

In one aspect, the recording unit 108 can be configured to convert at least a portion of a recording buffer to a recording for future access by a user. For example, in response to receiving a request to record a content transmission (e.g., content stream, content file transfer), the recording unit 108 can be configured to determine if a recording buffer has recorded any portion of the content transmission. In one aspect, the request to record the content transmission can comprise a request to record a content item, such as a particular show, episode, movie, programming or the like with a start time and an end time. In one aspect, the recording unit 108 can be configured to determine the start time of the requested content item. The recording unit 108 can be configured to determine a first portion of the content transmission beginning at the start time of the content item and ending at the start time of the requested recording. The recording unit 108 can be configured to determine a second portion of the content transmission beginning at the start time of the requested recording and ending at the end time of the content item.

In one aspect, the recording unit 108 can be configured to determine a portion of a content transmission stored in the recording buffer that comprises some or all of the portion of the content transmission beginning at the start time of the content item and ending at the start time of the requested recording (e.g., first portion). The recording unit 108 can be configured to combine or otherwise associate the portion of the content transmission stored in the recording buffer that comprises some or all of the first portion of the content transmission with a portion of the content transmission recorded by the recording unit 108 (e.g., second portion). For example, the content transmission can comprise a plurality of content fragments. The first portion of the content transmission can comprise a first plurality of fragments, and a second portion of the content transmission can comprise a second plurality of fragments. The recording unit 108 can be configured to associate the first plurality of fragments recorded in one recording buffer with the second plurality of fragments recorded in another recording buffer (e.g., or other storage location associated with the user). Associating can comprise linking, grouping, combining, and/or the like such that the first plurality of fragments can seamlessly be provided with the second plurality of fragments to a user (e.g., as a single recording).

As an illustration, a first user can access a content transmission (e.g., content stream, content file transfer) at or before the start time of a specific content item (e.g., show, episode, movie, program) provided by the content transmission. In response to the first user accessing the content transmission, the buffering unit 110 can be configured to activate a recording buffer to begin recording the content transmission. If at some time after the start time of the content item, the first user requests the recording unit 108 to record the content transmission, the recording unit 108 can record the content transmission beginning at the requested time. Then, the recording unit 108 can combine the portion of the content transmission from the recording buffer with the portion of the content transmission recorded after the request. In one aspect, a second user can access the content transmission. The second user can access the content transmission after the start time of the content item and/or after the first user accesses the content transmission. If the second user requests a recording of the content transmission, the recording unit 108 can be configured to record the content transmission beginning at the rime of the second user's request. The recording unit 108 can be configured to combine or otherwise associate the portion of the content transmission stored in the recording buffer assigned to the content transmission with the recorded portion of the content beginning at the request time of the second user.

As another illustration, a first user can request access to a content transmission at a first time. For the purposes of this illustration, it is assumed that the threshold value is one. The monitoring unit 106 can increment a counter associated with the content transmission to a value of one. The buffering unit 110 can assign a first recording buffer to the content transmission and/or activate recording of the content transmission. A second user can also request access to the content transmission at a second time. The monitoring unit 106 can increment the counter associated with the content transmission to a value of two. In some scenarios, the first user may choose to discontinue access to the content transmission (e.g., by requesting a different content transmission) at a third time. In response, the monitoring unit 106 can decrement the counter associated with the content transmission to a value of one. The buffering unit 110 can continue to record the content transmission because the counter has not fallen below the threshold. A third user can request access to the content transmission, and the monitoring unit 106 can increment the counter to two. The third user can request to record the content transmission at a fourth time. The recording unit 108 can record a portion of the content transmission beginning at the fourth time. The recording unit 108 can record the portion of the content transmission in a second recording buffer (e.g., or other storage) associated with the third user. The recording unit 108 can also combine or otherwise associate at least a portion of the content transmission recorded by the first recording buffer with at least a portion of the content transmission recorded by the second recording buffer. For example, the portions of the content transmission recorded in the first recording buffer and second recording buffer can collectively comprise an entire content item (e.g., show, episode, movie, program). If the portion of the content transmission recorded in the first recording buffer comprises a first part of the content item, and the portion of the content transmission recorded in the second recording buffer comprises a second part of the content item, then the recording unit 108 can combine or otherwise associate the available parts of the content item. The third user can later access the combined or associated portions of the content transmission recorded in the first recording buffer and the second recording buffer as a single content item. For example, the content unit 103 can be configured to provide the combined or otherwise associated portions of the content transmission to a user as a single recording and/or content item.

In one aspect, the system 100 can comprise one or more user devices 112. In one aspect, a user device 112 can be configured to receive content from the content device 102 through the network 104. For example, the user device 112 can be configured to receive content through packet switched networks and/or non-packet switched networks within the network 104. As an example, a user device 112 can comprise a set top box, laptop device, television, smart device (e.g., smart phone, smart glasses, smart watch), digital streaming device, portable device, tablet device, computer station, and/or the like.

In one aspect, a user device 112 can comprise a user interface configured to facilitate accessing content, such as content transmissions, from the content device 102. In one aspect, content transmission can be organized as channels (e.g., live content streams), content on demand, content recordings, and/or other content resources. In one aspect, a user device 112 can be configured to allow users to request that content transmissions be recorded for future access by the user. In one aspect, content transmissions can be recorded at the content device 102, user device 112, or other local or remote device. In one aspect, the user can access particular content items (e.g., show, episode, movie, program) through a live content transmission. The user can request a recording of a portion of the content transmission. For example, the user interface can be configured to allow a user to request that a content transmission be recorded from the time of the request. As another example, the user can request a recording of a content transmission be available for portions of the content transmission that were provided (e.g., in a live content transmission) before the request time. As an illustration, a content item can have a start time and end time. If additional recording of the content item is available, such as a portion of the content item provided before the request time, then the user can request access to the additional recording. In other scenarios, additional recordings can add to the amount of recorded content available to a user. For example, the additional recording can allow the content device 102 to provide a recording of content transmission from the content item's start time to the content item's end time.

Figure 2:
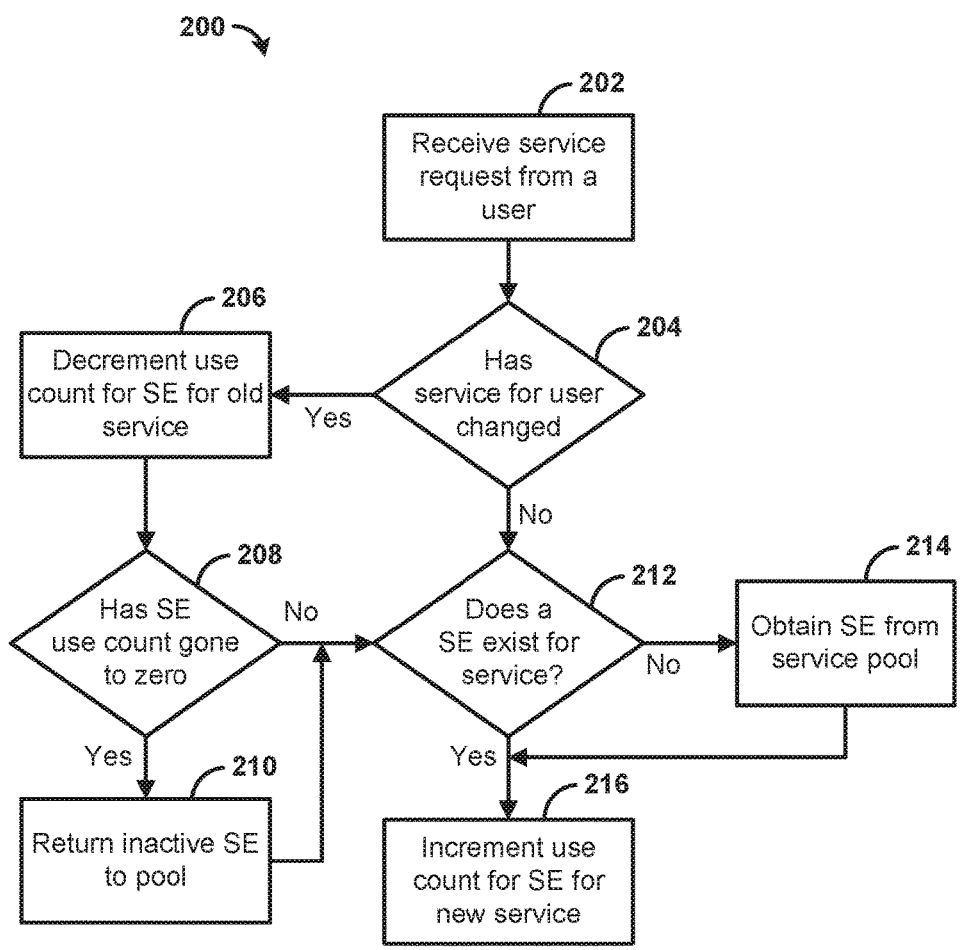
FIG. 2 is a flowchart illustrating an example method for providing a service.

FIG. 2 is a flowchart illustrating an example method 200 for providing a service. At step 202, a request for a service (e.g., content transmission, such as a content stream, an interactive service, content on demand, file transfer, and/or the like) can be received from a user (e.g., client device). For example, a request can be received for live streaming content. At step 204, a determination can be made as to whether the service requested by the user has changed in comparison to a previous request for a service by the user. If the service requested by the user has changed, the method 200 can proceed to step 206. For example, the request for service can comprise a service identifier. The service identifier can be compared with a service identifier of a service previously accessed (e.g., the most recently accessed service) by the user. If the service requested by the user has not changed, the method 200 can proceed to step 212.

At step 206, a counter associated with a storage element (SE) (e.g., a recording device, storage device, or time-shift buffer (TSB)) can be decremented if the service requested by the user has changed. For example, the counter can indicate the number of users accessing a particular service. In one aspect, the storage element can at least temporarily record content from a previous (e.g., the last) service accessed by the user. At step 208, a determination can be made as to whether the counter has a value of zero (e.g., or some other predetermined value). If the counter has a value of zero, then the method 200 can proceed to step 210. If the counter does not have a value of zero, then the method 200 can proceed to step 212. At step 210, a state of the time-shift buffer can be changed. For example, the storage element can be returned to a group of inactive storage elements. For example, the state of the storage element can be designated as inactive, or some of other value indicating that the storage element is ready to be reassigned to a service.

At step 212, a determination can be made as to whether a storage element is associated with (e.g., configured to actively record) the requested service. If the storage element is associated with the requested service, then the method 200 can proceed to step 216. If there is no storage element associated with the requested service, then the method 200 can proceed to step 214. At step 214, a storage element can be created and/or activated. For example, the storage element can be selected from a group of inactive storage elements. For example, the selected storage element can be associated with a service for the purpose of at least temporarily recording content. At step 216, a counter associated with the requested service can be incremented.

Figure 3:
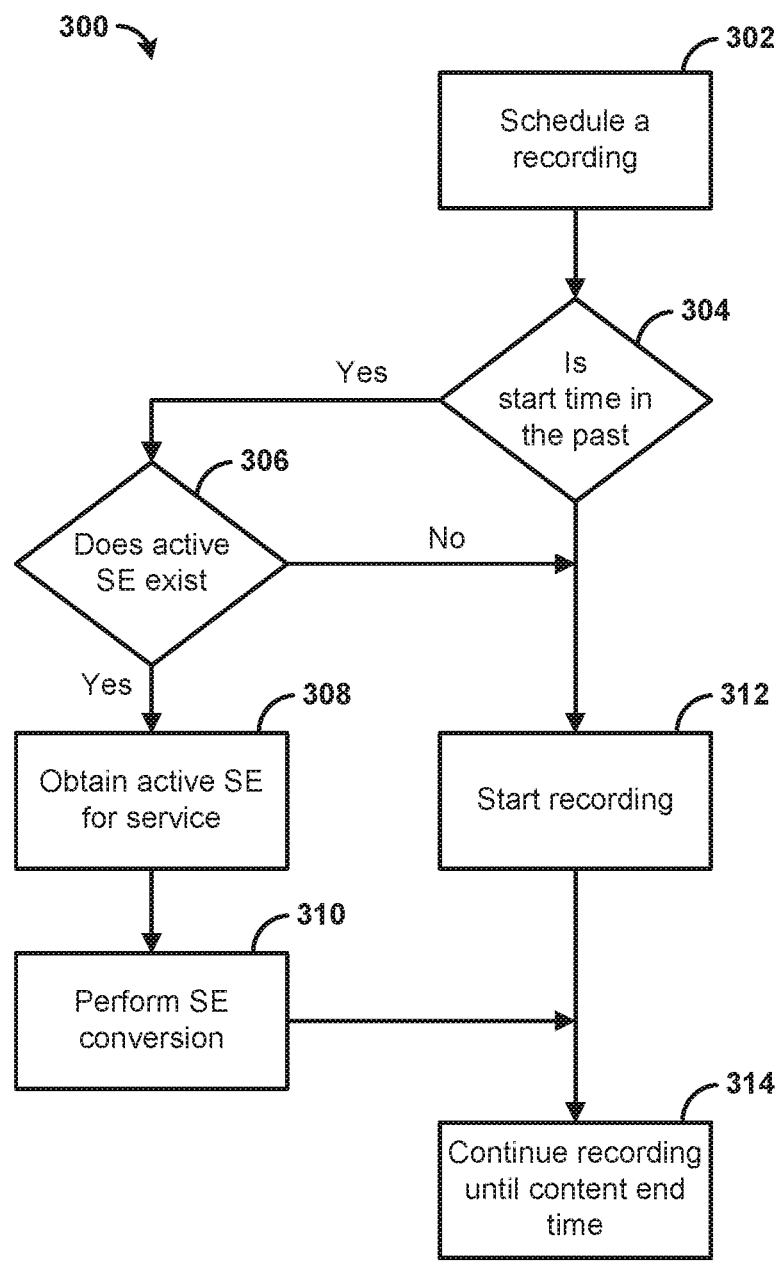
FIG. 3 is a flowchart illustrating another example method for providing a service.

FIG. 3 is a flowchart illustrating another example method 300 for providing a service. At step 302, a recording can be scheduled to begin. For example, the recording can be based on a request from a user accessing content through a service, such as a content transmission, content stream, file transfer, and/or the like. In one aspect, the recording can be scheduled to begin immediately. At step 304, a determination can be made as to whether the start time of content to be recorded is in the past. For example, the request can be a request to record a live content transmission. The live content transmission can comprise content, such as a show, episode, movie, programming, and the like with a start time and an end time. The request for recording of the content can be received after the start time of the content. If the start time of the content is before the recording is scheduled to begin, then the method can proceed to step 306. If the start time of the content is not before the recording is scheduled to begin, then the method 300 can proceed to step 312.

At step 306, a determination can be made as to whether an active storage element (SE) (e.g., time-shift buffer) is associated with (e.g., assigned to record content from) the service scheduled to be recorded. For example, an active storage element associated with the service can be configured to at least temporarily record content delivered through the service. If an active storage element is associated with the service, then the method 300 can proceed to step 308. If an active storage element is not associated with the service, then the method 300 can proceed to step 312.

At step 308, an active storage element can be associated with (e.g., assigned to record content from) the service. For example, a storage element can be selected from a pool (e.g., a group) of inactive storage elements. The storage element can be activated for at least temporarily recording content from the service. At step 310, storage element conversion can be performed. For example, content recorded in the storage element can be combined (e.g., appending one file to another, organizing a first set of content fragments and a second set of content fragments as one content item) with the recording of the content initiated at step 302. The content recorded in the storage element can be combined with the recording of the content at a storage location such as content storage device (e.g. storage element) remote or local to a user. As an illustration, a portion of the content recorded in the storage element can be selected. The portion of the content can begin at the start time of the content. The portion of the content can end at the time when the requested recording began.

At step 312, recording of content provided by the service can begin. For example, the content can be recorded in a local device or a device remote from a user location. The recording can be accessed later by the user at a variety of locations through a variety of devices. At step 314, recording can continue until the content provided by the service ends. For example, the recording can end at the end time of a show, episode, movie, programming, or the like.

Figure 4:
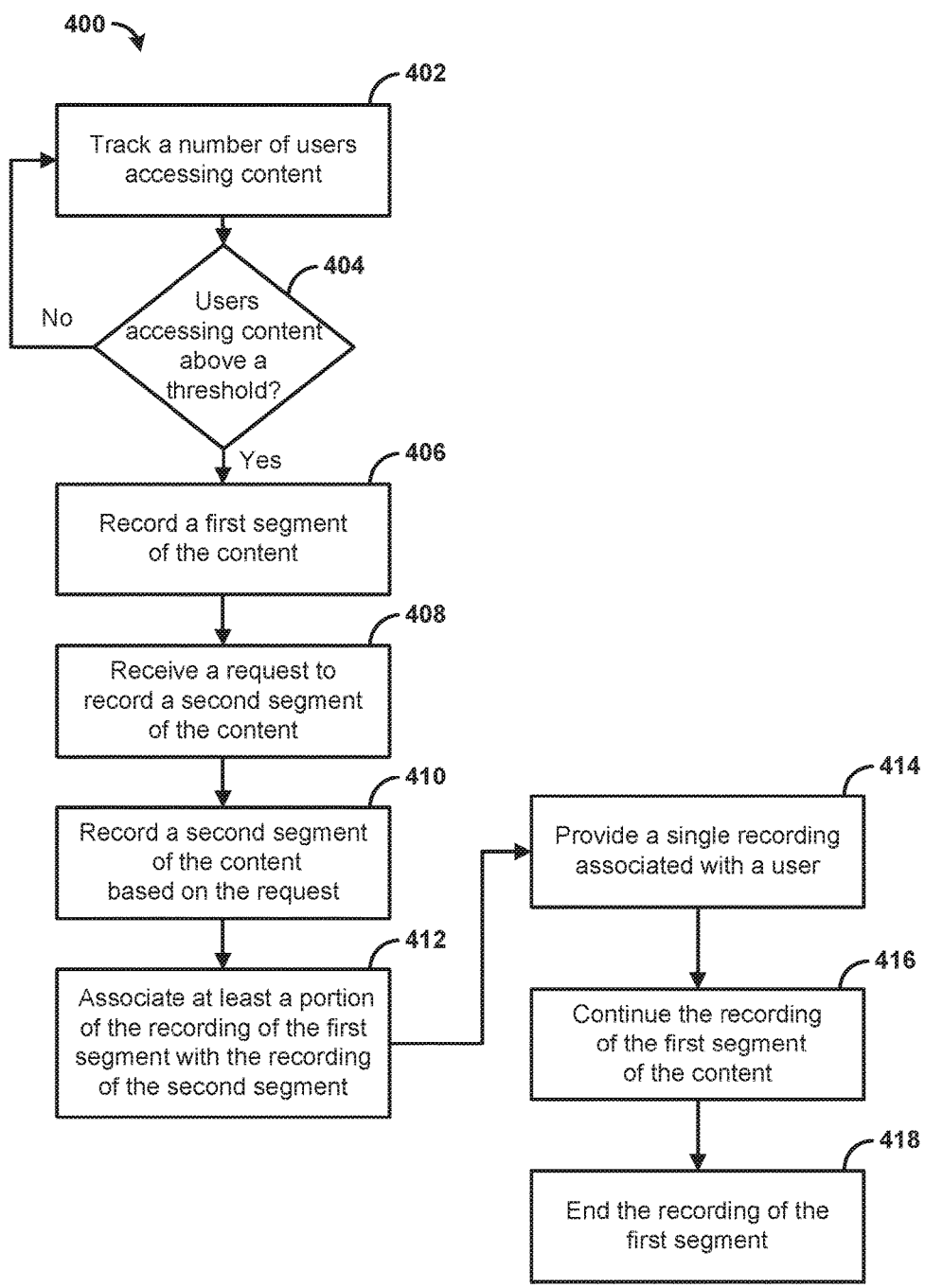
FIG. 4 is a flowchart illustrating an example method for managing content.

FIG. 4 is a flowchart illustrating an example method 400 for managing content. At step 402, a number of users (e.g., subscribers, clients, devices) accessing content (e.g., transmission, stream, file) can be monitored (e.g., tracked). For example, a count of the number of users accessing the content can be increased and/or decreased based on a change in the number of users accessing the content. As an illustration, when a user tunes to, requests, or otherwise access the content, the count can be increased or incremented by one or some other appropriate value. When a user (e.g., the same or a different user) tunes away from, disconnects from or otherwise leaves the content, the count can be decreased or decremented by one or some other value. As long as at least one user is tuned to or otherwise accessing the content, the count can have a value greater than zero. When no users are tuned to or otherwise accessing the content, then the count can have a value of zero.

At step 404, a determination can be made as to whether the number of users (e.g., subscribers, clients, devices) accessing the content is at or above a threshold value. For example, the threshold value can be 0, 1, 5, 10, 20, 50, 100, 1000, or any appropriate value. If the number of users is at or above the threshold value, then the method 400 can proceed to step 406. If the number of users is not at or above the threshold value, the method 400 can return to step 402.

At step 406, a first segment of the content can be recorded. For example, the first segment of the content can be recorded in a temporary storage buffer, such as a time-shift buffer. The temporary storage buffer can be continually updated such that only the most recent portion of the content (e.g., the last 2 hours) is stored in the temporary storage buffer. For example, the temporary storage buffer can have a limited allocation of space. As the temporary storage buffer continues to record new content, content recorded in the buffer (e.g., the oldest content) can be deleted and/or replaced with new content.

In some implementations of step 406, the first segment of the content can be recorded as long as the number of users accessing the content is equal to the threshold value and/or above the threshold value. For example, the count can be compared to the threshold value at regular or irregular time intervals. If the count is below the threshold, then the temporary storage buffer can be released from recording and, in some aspects, associated with a pool of unassociated storage buffers. In some scenarios, the recording can be deleted or otherwise overwritten after it is released. In other scenarios, the recording can be saved and/or copied to another a storage location.

At step 408, a request to record a second segment of the content can be received. For example, a user can request to record at least a portion of the content (e.g., content stream). The request can be for a recording of an entire content item or for a portion thereof. As a further example, the user can press a record button or otherwise provide a similar instruction while the user is accessing the content.

At step 410, a second segment of the content can be recorded based on the request to record the second segment of the content. For example, the second segment can be recorded in a storage location associated with the user. As another example, the second segment can be recorded in a temporary recording buffer. The second segment can be copied from the temporary recording buffer to a storage location associated with the user.

At step 412, at least a portion of the recording of the first segment of the content can be associated with (e.g., combined with, stored with, appended to, indexed together, listed together, logically associated as a file) the recording of the second segment of the content. As an illustration, the content can comprise a content item having a start time and an end time. In one aspect, the first segment of the content can comprise a first part of a content item. The first part of the content item can begin at a first time (e.g., start time). In some scenarios, the first time can be after the time at which recording of the first segment of the content begins. In other scenarios, the first time can be before the time at which recording of the first segment begins. In one aspect, the second segment of the content can comprise a second part of the content item. The second part of the content item can begin at a second time. The second time can be after the first time. If the first time is after the time at which recording of the first segment begins, then the first part and the second part of the content item can together comprise the entire content item. If the first time is before the time at which recording of the first segment begins, then the first part and the second part of the content item can together comprise a portion of the content item.

In one aspect, step 412 can comprise combining the first part of the content item and the second part of the content item to obtain a single content item (e.g., a single recording). For example, the first segment can comprise a plurality of first content fragments. The second segment can comprise a plurality of second content fragments. At least a portion of the first content fragments can be copied and added to at least a portion of the second content fragments. The single content item can comprise more of the content item than was available in the second segment. In one aspect, the single content item can be associated with the user requesting to record the second segment of the content.

At step 414, the single content item associated with a user can be provided. For example, the recording of the first segment of the content and the associated recording of the second segment of the content can be provided as the single content item associated with the user. In one aspect, step 414 can occur if the start time of the content item is prior in time to a start time of the recording of the second segment of the content. In one aspect, the single content item can be provided to the user through an access and/or delivery network. For example, the recording can be provided through a packet switching protocol (e.g., Internet Protocol) and/or a non-packet switching protocol (e.g., quadrature amplitude modulation).

At step 416, the recording of the first segment of the content can be continued if the number of users accessing the content becomes less than the threshold value. For example, the recording can be continued based on a prediction that the number of users accessing the content will reach the threshold value again within a specified time period. The prediction can be based on user viewing statistics. The user viewing statistics can comprise user viewing history for the content at a variety of times. The specified time period can be any number of seconds and/or minutes, such as 10, 20, 30, or 45 seconds or 1, 3, 5, 10, 30, 45 minutes and the like.

At step 418, recording of the first segment of the content can be ended if the number of users accessing the content becomes less than the threshold value. For example, if the number of users accessing the content is below the threshold, then the temporary storage buffer can be released from recording and associated with a pool of unassociated storage buffers. In some scenarios, the recording can be deleted or otherwise overwritten after it is released. In other scenarios, the recording can be saved and/or copied to another storage location.

Figure 5:
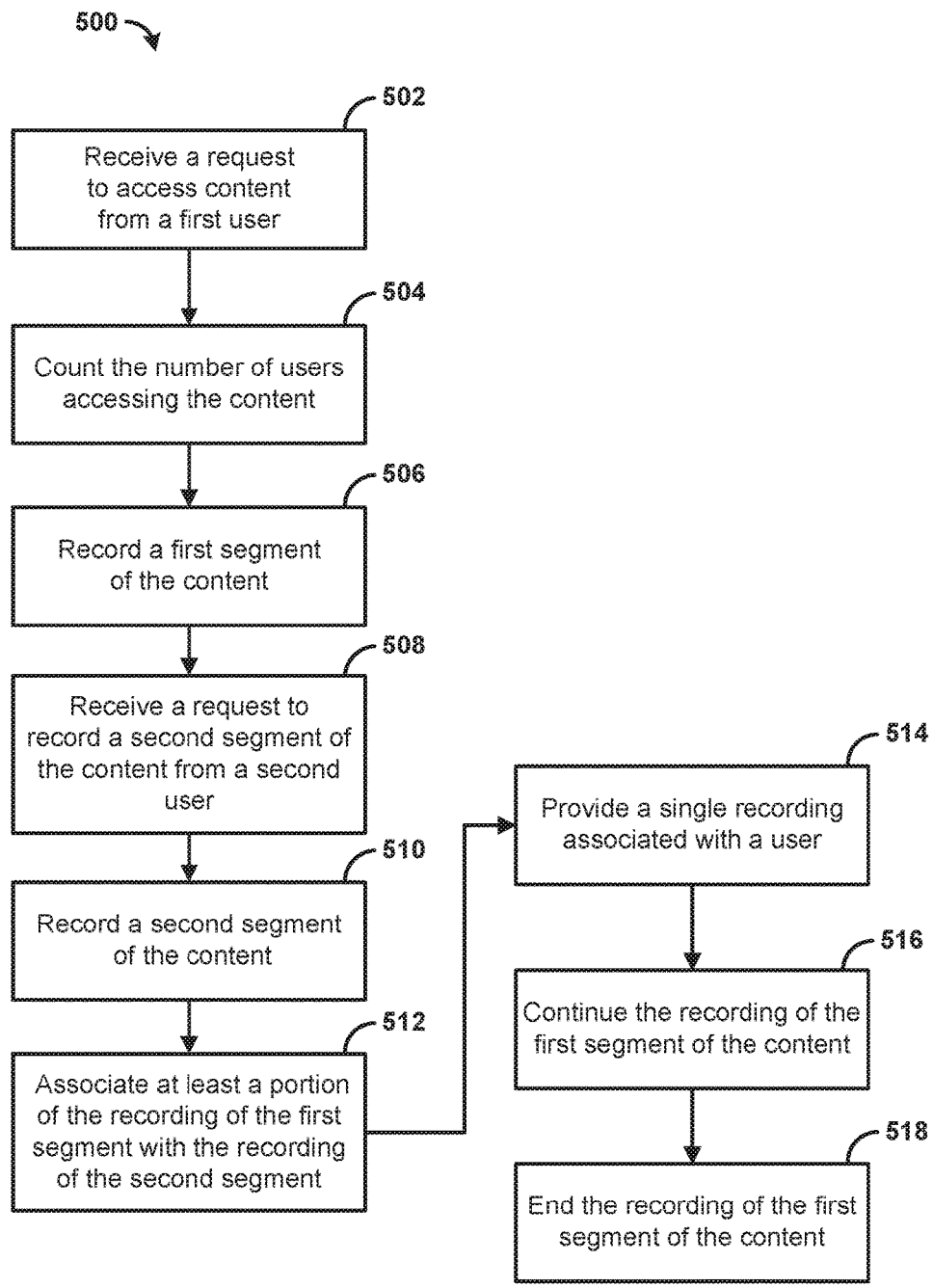
FIG. 5 is a flowchart illustrating another example method for managing content.

FIG. 5 is a flowchart illustrating another example method 500 for managing content. At step 502, a request to access content (e.g., transmission, stream, file) can be received from a first user (e.g., subscriber, client, device). For example, the first user can tune to the content or request the content based on a uniform resource identifier, such as a hypertext transfer protocol based identifier.

At step 504, the number of users (e.g., subscribers, clients, devices) accessing the content can be determined (e.g., counted). As an illustration, when a user tunes to, requests, or otherwise accesses the content, a count of the number of users can be increased or incremented by one or some other appropriate value. When a user (e.g., the same or a different user) tunes away from, disconnects from, or otherwise leaves the content, the count of the number of users can be decreased or decremented by one or some other value. As long as at least one user is tuned to or otherwise accessing the content, the count of the number of users can have a value greater than zero. When no users are tuned to or otherwise accessing the content, then the count of the number of users can have a value of zero.

At step 506, a first segment of the content can be recorded. For example, the first segment can be recorded based on the request to access the content from the first user. In one aspect, the first segment of the content can be recorded in a temporary storage buffer, such as a time-shift buffer. The temporary storage buffer can be continually updated such that only the most recent portion of the content (e.g., the last 2 hours) is stored in the temporary storage buffer. For example, the temporary storage buffer can have a limited allocation of space. As the temporary storage buffer continues to record new content (e.g., from a content stream), content recorded in the buffer (e.g., the oldest content) can be deleted and/or replaced with new content (e.g., from the content stream).

In one aspect, recording the first segment can occur if a counter is at or above a threshold value. For example, the threshold value can be 0, 1, 5, 10, 20, 50, 100, 1000, or any appropriate value. As another example, recording the first segment of the content can be recorded as long as a number of users accessing the content is equal to the threshold value and/or above the threshold value. For example, the number can be compared to the threshold value at regular or irregular time intervals. If the number is below the threshold, then the temporary storage buffer can be released from recording and associated with a pool of unassociated storage buffers. In some scenarios, the recording of the first segment can be deleted or otherwise overwritten after it is released. In other scenarios, the recording of the first segment can be saved and/or copied to another storage location.

At step 508, a request to record a second segment of the content can be received from a second user. For example, the second user can request to record at least a portion of the content. The request can be for a recording of an entire content item or for a portion thereof. As a further example, the second user can press a record button or otherwise provide a similar instruction while the user is accessing the content.

At step 510, the second segment of the content can be recorded. For example, the second segment can be recorded in a storage location associated with the second user. As another example, the second segment can be recorded in a temporary recording buffer. The second segment can be copied from the temporary recording buffer to a storage location associated with the second user.

At step 512, at least a portion of the recording of the first segment of the content can be associated with (e.g., combined with, stored with, appended to, indexed together, listed together, logically associated as a file) the recording of the second segment of the content. As an illustration, the content can comprise a content item having a start time and an end time. The first segment can begin at a first time. The second segment can begin at a second time. In one aspect, the first segment of the content can comprise a first part (e.g., segment, portion) of a content item. The first part of the content item can begin at a third time (e.g., start time). In some scenarios, the third time can be after first time. In other scenarios, the third time can be before the first time. In one aspect, the second segment of the content can comprise a second part of the content item. The second part of the content item can begin at the second time. The second time can be after the third time. If the third time is after first time, then the first part and the second part of the content item can together comprise the entire content item. If the third time is before the first time, then the first part and the second part of the content item can together comprise a portion of the content item. In one aspect, associating at least the portion of the recording of the first segment of the content with the recording of the second segment of the content can occur if a start time of the content item is prior in time to the second time.

In one aspect, step 512 can comprise combining the first part of the content item and the second part of the content item to obtain a single recording. For example, the first segment can comprise a plurality of first content fragments. The second segment can comprise a plurality of second content fragments. At least a portion of the first content fragments can be copied and added to at least a portion of the second content fragments. The single recording can comprise more of the content item than was available in the second segment. In one aspect, the single recording can be associated with the second user.

At step 514, a single recording can be provided to the second user. For example, the at least a portion of the recording of the first segment of the content associated with the recording of the second segment of the content can be provided as a single recording associated with the second user. In one aspect, the single recording can be provided to the second user through an access and/or delivery network. For example, the recording can be provided through a packet switching protocol (e.g., Internet Protocol) and/or a non-packet switching protocol (e.g., quadrature amplitude modulation).

At step 516, the recording of the first segment of the content can be continued. In one aspect, the recording can be continued if the number of users accessing the content becomes less than a threshold value. For example, the recording based on a prediction that the number of users accessing the content will reach the threshold value again within a specified time period. The prediction can be based on user viewing statistics. The user viewing statistics can comprise user viewing history for the content at a variety of times. The specified time period can be any number of seconds and/or minutes, such as 10, 20, 30, or 45 seconds or 1, 3, 5, 10, 30, 45 minutes and the like.

At step 518, the recording of the first segment of the content can be ended. For example, recording of the first segment can be ended if the number of users accessing the content becomes less than the threshold value. For example, if the number of users accessing the content is below the threshold, then the temporary storage buffer can be released from recording and associated with a pool of unassociated storage buffers. In some scenarios, the recording of the first segment can be deleted or otherwise overwritten after it is released. In other scenarios, the recording of the first segment can be saved and/or copied to another a storage location.

Figure 6:
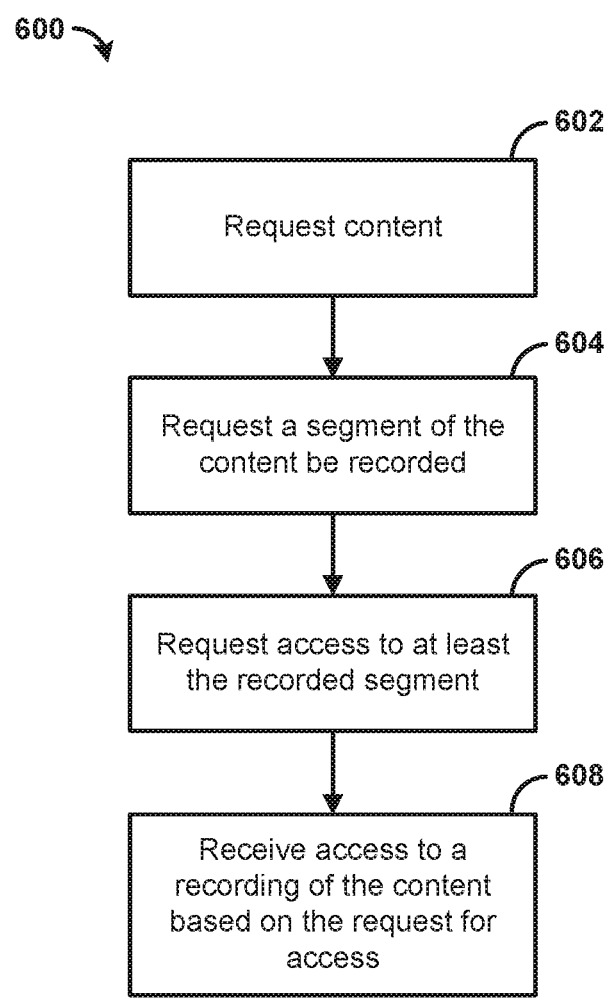
FIG. 6 is a flowchart illustrating yet another example method for managing content.

FIG. 6 is a flowchart illustrating yet another example method 600 for managing content. At step 602, content (e.g., content item, transmission, stream, recording) can be requested (e.g., by a user). In one aspect, the content can comprise a content item having a start time and an end time. For example, the content can comprise a first segment. The first segment of the content can comprise a first part (e.g., portion, segment) of a content item. The first part of the content item can begin at a first time. The first segment of the content can be recorded if the number of users (e.g., subscribers, clients, devices) accessing the content reaches a threshold value. For example, the first segment of the content can be recorded at a device. The device can be configured to record the first segment of the content as long as the number of users accessing the content is equal to the threshold value and/or above the threshold value.

In one aspect, the device can be configured to monitor (e.g., track) the number of users (e.g., subscribers, clients, devices) accessing the content. For example, the first segment of the content can be recorded at the device in a time-shift buffer if the number of users accessing the content reaches the threshold value. In another aspect, the first segment of the content is not recorded at the device if the number of users accessing the content becomes less than the threshold value. In some scenarios, the device can be configured to record the first segment of the content if the number of users accessing the content becomes less than the threshold value. For example, the device can be configured to record the first segment based on a prediction that the number of users accessing the content will reach the threshold value again within a specified time period.

At step 604, it can be requested that a second segment of the content be recorded. The second segment of the content can comprise a second part of the content item. The second part of the content item can begin at a second time. For example, a user can request to record at least a portion of the content. The request can be for a recording of an entire content item or for a portion thereof. As a further example, the user can press a record button or otherwise provide a similar instruction while the user is accessing the content.

At step 606, access to at least the recording of the second segment of the content can be requested. For example, the user can request to view the content through a content interface on a set-top box, television, digital streaming device, computer, smart device (e.g., phone, watch, glasses, and the like), mobile device, tablet device, and/or the like.

At step 608, access can be received to a recording of the content. In one aspect, the recording of the content can comprise at least some of the recording of the first segment of the content and at least some of the recording of the second segment of the content. For example, at least some of the recording of the first segment of the content and at least some of the recording of the second segment of the content can be received as a single recording (e.g., copy, version, instance of content) associated with a user. As a further illustration, the first segment can comprise a plurality of first content fragments. The second segment can comprise a plurality of second content fragments. At least a portion of the first content fragments can be copied and added (e.g., as part of a complete content item) to at least a portion of the second content fragments. The single recording can comprise more of the content item than was available in the second segment. In one aspect, the single recording can be associated with the user. In one aspect, step 608 can be performed in response to step 606. In one aspect, receiving access to the recording of the content can occur if the start time of the content item is prior in time to a start time of the recording of the second segment of the content.

Figure 7:
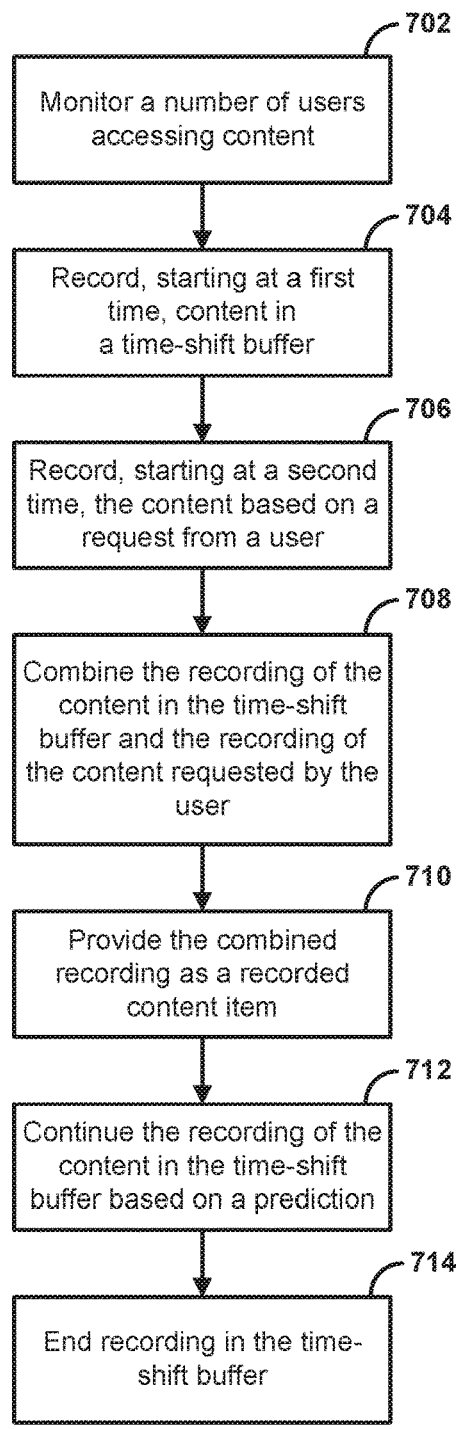
FIG. 7 is a flowchart illustrating an example method for managing content.

FIG. 7 is a flowchart illustrating an example method 700 for managing content. At step 702, a number of users (e.g., subscribers, clients, devices) accessing content (e.g., transmission, stream, file) can be monitored (e.g., tracked). For example, a count of the number of users accessing the content can be increased and/or decreased based on a change in the number of users accessing the content. As an illustration, when a user tunes to, requests, or otherwise accesses the content, the count can be increased or incremented by one or some other appropriate value. When a user (e.g., the same or a different user) tunes away from, disconnects from, or otherwise leaves the content, the count can be decreased or decremented by one or some other value. As long as at least one user is tuned to or otherwise accessing the content, the count can have a value greater than zero. When no users are tuned to or otherwise accessing the content, then the count can have a value of zero.

At step 704, the content can be recorded, starting at a first time, in a time-shift buffer. The content can be recorded based on the number of users accessing the content reaching a threshold value. For example, recording the content in the time-shift buffer based on the number of users accessing the content reaching a threshold value can comprise recording a first segment of the content as long as the number of users accessing the content is equal to the threshold value and/or above the threshold value.

In one aspect, the time-shift buffer can comprise a temporary storage buffer configured to maintain a recording of a portion of the content. The portion can be continually updated such that only the most recent portion of the content (e.g., the last 2 hours) is stored in the temporary storage buffer. For example, the time-shift buffer can have a limited allocation of space. As the time-shift buffer continues to record new content (e.g., from a content stream), content recorded in the buffer (e.g., the oldest content) can be deleted and/or replaced with new content (e.g., from the content stream).

At step 706, the content can be recorded, starting at a second time, based on a request from a user. In one aspect, the first time can occur prior to the second time. For example, the portion of the content recorded starting at the second time can be recorded in a storage location associated with the user. As another example, the portion of the content recorded starting at the second time can be recorded in a temporary recording buffer. The portion of the content recorded starting at the second time can be copied from the temporary recording buffer to a storage location associated with the user.

At step 708, the recording of the content in the time-shift buffer and the recording of the content requested by the user can be combined or otherwise associated. For example, the portion of the content recorded starting at the first time can comprise a plurality of first content fragments. The portion of the content recorded starting at the second time can comprise a plurality of second content fragments. At least a portion of the first content fragments can be copied and added to at least a portion of the second content fragments. The combined recording can comprise more of the content item than was available in the portion of the content recorded starting at the second time. In one aspect, the combined recording can be associated with the user.

In one aspect, the content can comprise a content item having a start time and an end time. The recording of the content in the time-shift buffer (e.g., starting at the first time) can comprise a first part of the content item. In one aspect, the recording of the content requested by the user (e.g., starting at the second time) can comprise a second part of the content item. Combining the recording of the content in the time-shift buffer and the recording of the content requested by the user can occur if the start time of the content item is prior in time to the second time.

At step 710, the combined recording can be provided (e.g. presented, transmitted) as a recorded content item (e.g., a single recording, copy, instance, version and/or the like that comprises at least some recorded content). In one aspect, the recorded content item can be provided to the second user through an access and/or delivery network. For example, the recorded content item can be provided through a packet switching protocol (e.g., Internet Protocol) and/or a non-packet switching protocol (e.g., quadrature amplitude modulation).

At step 712, recording of the content in the time-shift buffer can be continued. For example, the recording can be continued if the number of users accessing the content becomes less than the threshold value. As a further example, the recording can be continued based on a prediction that the number of users accessing the content will reach the threshold value again within a specified time period. The prediction can be based on user viewing statistics. The user viewing statistics can comprise user viewing history for the content at a variety of times. The specified time period can be any number of seconds and/or minutes, such as 10, 20, 30, or 45 seconds or 1, 3, 5, 10, 30, 45 minutes and the like.

At step 714, recording in the time-shift buffer can be ended. For example, recording can be ended if the number of users accessing the content becomes less than the threshold value. For example, if the number of users accessing the content is below the threshold, then the time-shift buffer can be released from recording and associated with a pool of unassociated storage buffers. In some scenarios, the recording in the time-shift buffer can be deleted or otherwise overwritten after it is released. In other scenarios, the recording in the time-shift buffer can be saved and/or copied to another a storage location.

Figure 8:
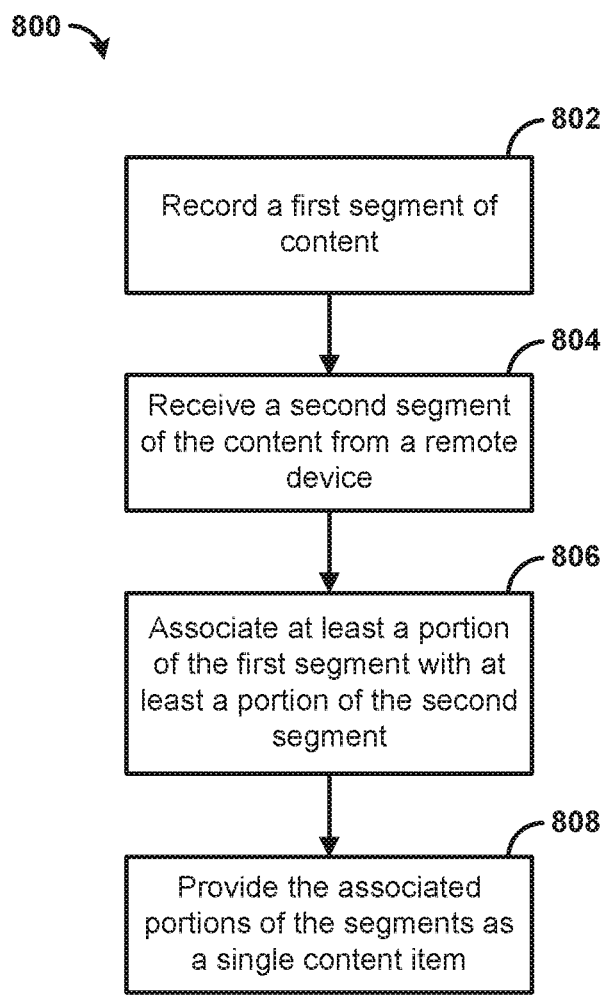
FIG. 8 is a flowchart illustrating an example method for managing content.

FIG. 8 is a flowchart illustrating yet another method 800 for managing content. At step 802, a first segment of content (e.g., transmission, stream, file) can be recorded. For example, the first segment can be recorded in a local device, such as a set-top box, digital video recorder, or other computing device. The first segment can be recorded in a permanent storage location or a temporary storage buffer on the local device.

At step 804, a second segment of the content can be received from a remote device. In one aspect, the at least a portion of the second segment can be recorded by the remote device prior in time to the recording of the at least a portion of the first segment. The remote device can be configured to record the content in a temporary recording buffer based on a threshold number of users accessing the content. In one aspect, the second segment of the content can be recorded at the remote device in a time-shift buffer if the number of users accessing the content reaches the threshold number. As a further example, the remote device can be configured to record the second segment of the content as long as the number of users accessing the content is equal to the threshold number and/or above the threshold number. In some implementations, the remote device can be configured to end recording of the content if the number of users accessing the content becomes less than the threshold number. In other implementations, the remote device can be configured to record the second segment of the content if the number of users accessing the content becomes less than the threshold number based on a prediction that the number of users accessing the content will reach the threshold number again within a specified time period.

In one aspect, the remote device can be configured to track the number of users accessing the content. As an illustration, when a user tunes to, requests, or otherwise accesses the content, the remote device can be configured to increase or increment a counter by one or some other appropriate value. When a user (e.g., the same or a different user) tunes away from, disconnects from, or otherwise leaves content, the remote device can be configured to decrease or decrement the counter by one or some other value. As long as at least one user is tuned to or otherwise accessing the content, the count can have a value greater than zero. When no users are tuned to or otherwise accessing the content, then the count can have a value of zero.

At step 806, at least a portion of the first segment can be associated with at least a portion of the second segment. In one aspect, associating the at least a portion of the first segment with the at least a portion of the second segment can occur if the start time of the content item is prior in time to a start time of the recording of the first segment of the content.

As an illustration, the content can comprise a content item having a start time and an end time. In one aspect, the second segment of the content can comprise a first part of a content item. The first part of the content item can begin at a first time (e.g., start time). In some scenarios, the first time can be after the time at which recording of the first segment of the content begins. In other scenarios, the first time can be before the time at which recording of the second segment begins. In one aspect, the first segment of the content can comprise a second part of the content item. The second part of the content item can begin at a second time. The second time can be after the first time. If the first time is after the time at which recording of the second segment begins, then the first part and the second part of the content item can together comprise the entire content item. If the first time is before the time at which recording of the second segment begins, then the first part and the second part of the content item can together comprise a portion of the content item.

In one aspect, step 806 can comprise combining the first part of the content item and the second part of the content item to obtain a single recording. For example, the first segment can comprise a plurality of first content fragments. The second segment can comprise a plurality of second content fragments. At least a portion of the second content fragments can be copied and added to at least a portion of the first content fragments. The single recording can comprise more of the content item than was available in the first segment.

At step 808, the at least a portion of the first segment associated with the at least a portion of the second segment can be provided as a single content item (e.g., single content recording). For example, the local device can provide the single recording to a remote or local user.

Figure 9:
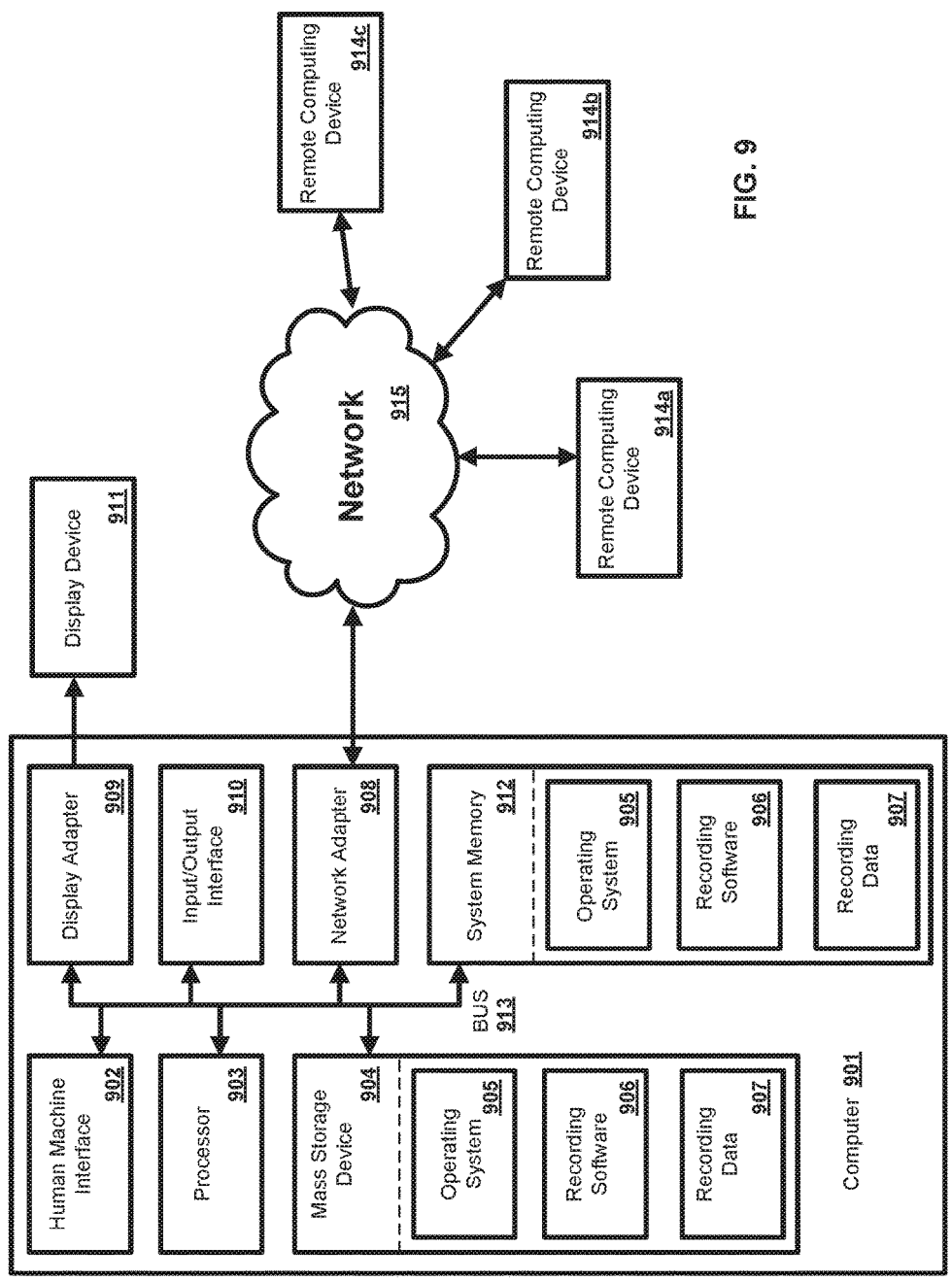
FIG. 9 is a block diagram illustrating an example computing device which can be used to implement various methods and systems disclosed herein.

In an exemplary aspect, the methods and systems can be implemented on a computer 901 as illustrated in FIG. 9 and described below. By way of example, the content device 102 of FIG. 1 can be a computer as illustrated in FIG. 9. Similarly, the methods and systems disclosed can utilize one or more computers to perform one or more functions in one or more locations. FIG. 9 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 901. The components of the computer 901 can comprise, but are not limited to, one or more processors or processing units 903, a system memory 912, and a system bus 913 that couples various system components including the processor 903 to the system memory 912. In the case of multiple processing units 903, the system can utilize parallel computing.

The system bus 913 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (ACIP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description can also be implemented over a wired or wireless network connection and each of the subsystems, including the processor 903, a mass storage device 904, an operating system 905, recording software 906, recording data 907, a network adapter 908, system memory 912, an Input/Output Interface 910, a display adapter 909, a display device 911, and a human machine interface 902, can be contained within one or more remote computing devices 914a,b,c at physically separate locations, connected through buses of this form, in effect implementing a fully distributed system.

The computer 901 typically comprises a variety of computer readable media. Exemplary readable media can be any available media that is accessible by the computer 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data, such as recording data 907, and/or program modules, such as operating system 905 and recording software 906, that are immediately accessible to and/or are presently operated on by the processing unit 903.

In another aspect, the computer 901 can also comprise other removable/non-removable, volatile/non-volatile computer storage media. By way of example, FIG. 9 illustrates a mass storage device 904 which can provide non-volatile storage of computer code, computer readable instructions, data structures, program modules, and other data for the computer 901. For example and not meant to be limiting, a mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, an operating system 905 and recording software 906. Each of the operating system 905 and recording software 906 (or some combination thereof) can comprise elements of the programming and the recording software 906. Recording data 907 can also be stored on the mass storage device 904. Recording data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 901 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 903 via a human machine interface 902 that is coupled to the system bus 913, but can be connected by other interface and bus structures, such as a parallel port, game port, an IEEE 1394 Port (also known as a Firewire port), a serial port, or a universal serial bus (USB).

In yet another aspect, a display device 911 can also be connected to the system bus 913 via an interface, such as a display adapter 909. It is contemplated that the computer 901 can have more than one display adapter 909 and the computer 901 can have more than one display device 911. For example, a display device can be a monitor, an LCD (Liquid Crystal Display), or a projector. In addition to the display device 911, other output peripheral devices can comprise components, such as speakers (not shown) and a printer (not shown) which can be connected to the computer 901 via. Input/Output Interface 910. Any step and/or result of the methods can be output in any form to an output device. Such output can be any form of visual representation, including, but not limited to, textual, graphical, animation, audio, tactile, and the like. The display 911 and computer 901 can be part of one device, or separate devices.

The computer 901 can operate in a networked environment using logical connections to one or more remote computing devices 914a,b,c. By way of example, a remote computing device can be a personal computer, portable computer, smartphone, a server, a router, a network computer, a peer device or other common network node, and so on. Logical connections between the computer 901 and a remote computing device 914a,b,c can be made via a network 915, such as a local area network (LAN) and/or a general wide area network (WAN). Such network connections can be through a network adapter 908. A network adapter 908 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 905, are illustrated herein as discrete blocks, although it is recognized that such programs and components reside at various times in different storage components of the computing device 901, and are executed by the data processor(s) of the computer. An implementation of recording software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques, such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   determining a quantity of user devices accessing content;
   recording, based on the quantity of user devices accessing the content satisfying a threshold, a first segment of the content;
   recording, based on a request to record the content, a second segment of the content;
   associating a portion of the recording of the first segment of the content with the recording of the second segment of the content; and
   causing output of the portion of the recording of the first segment of the content and the recording of the second segment of the content as a single recording.

2. The method of claim 1, further comprising:
   incrementing, based on a notification that a user device has accessed the content, a counter.

3. The method of claim 1, further comprising:
   determining that the quantity of user devices accessing the content does not satisfy the threshold; and
   terminating, based on determining that the quantity of user devices accessing the content does not satisfy the threshold, the recording of the first segment of the content.

4. The method of claim 3, further comprising:
   determining that the quantity of user devices accessing the content no longer satisfies the threshold;
   determining, based on the quantity of user devices accessing the content no longer satisfying the threshold, that another quantity of user devices accessing the content will satisfy the threshold within a time period; and
   resuming, based on determining that the another quantity of user devices accessing the content will satisfy the threshold within the time period, the recording of the first segment of the content.

5. The method of claim 1, wherein the first segment of the content comprises a first part of a content item and the second segment of the content comprises a second part of the content item.

6. The method of claim 1, wherein the recording of the first segment of the content begins prior in time to the recording of the second segment of the content.

7. The method of claim 1, wherein recording the first segment of the content comprises storing the first segment of the content in a temporary storage buffer.

8. The method of claim 7, wherein recording the second segment of the content comprises storing the second segment of the content in a storage associated with a user device based on a request for the content.

9. A method, comprising:
   receiving, from a first user device, a first request to record content;
   recording, based on the first request, a first segment of the content;
   receiving, from a second user device, a second request to record the content;
   recording, based on the second request, a second segment of the content;
   associating a portion of the recording of the first segment of the content with the recording of the second segment of the content; and
   causing output of the portion of the recording of the first segment of the content and the recording of the second segment of the content as a single recording.

10. The method of claim 9, further comprising incrementing, based on one or more of the first request to record the content or the second request to record the content, a counter.

11. The method of claim 9, wherein recording the first segment of the content is based on a quantity of user devices accessing the content satisfying a threshold.

12. The method of claim 9, wherein recording the first segment of the content comprises storing the first segment of the content in a temporary storage buffer.

13. The method of claim 11, further comprising
   determining that the quantity of user devices accessing the content no longer satisfies the threshold;
   determining, based on the quantity of user devices accessing the content no longer satisfying the threshold, that another quantity of user devices accessing the content will satisfy the threshold within a time period; and
   resuming, based on determining that the another quantity of user devices accessing the content will satisfy the threshold within the time period, the recording of the first segment of the content.

14. The method of claim 9, wherein the first segment of the content comprises a first part of a content item and the second segment of the content comprises a second part of the content item.

15. A method comprising:
   storing a first segment of content;
   receiving a second segment of the content from a storage device, wherein the storage device is configured to store the content in a temporary storage buffer based on a threshold number of users accessing the content;

associating a portion of the first segment of the content with a portion of the second segment of the content, wherein the portion of the second segment of the content is stored by the storage device prior in time to the storing of the portion of the first segment of the content; and causing output of the portion of the first segment of the content and the portion of the second segment of the content as a single content item.

16. The method of claim 15, wherein the second segment of the content is stored at the storage device in a time-shift buffer when the quantity of user devices accessing the content satisfies the threshold.

17. The method of claim 15, wherein the second segment of the content comprises a first part of the single content item and the first segment of the content comprises a second part of the single content item, and wherein the first part of the single content item begins at a first time and the second part of the single content item begins at a second time.

18. The method of claim 15, wherein the storage device is further configured to determine the quantity of user devices accessing the content.

19. The method of claim 18, wherein the storage device is configured to store the portion of the second segment of the content when the quantity of user devices accessing the content does not satisfy the threshold based on a prediction that the quantity of user devices accessing the content will satisfy the threshold within a time period.

20. The method of claim 18, wherein the storage device is further configured to store the portion of the second segment of the content while the quantity of user devices accessing the content satisfies the threshold.

* * * * *